Aug. 9, 1932.  J. J. TIPTON  1,870,760
PIPE LINE DOLLY
Filed June 24, 1931  2 Sheets-Sheet 1
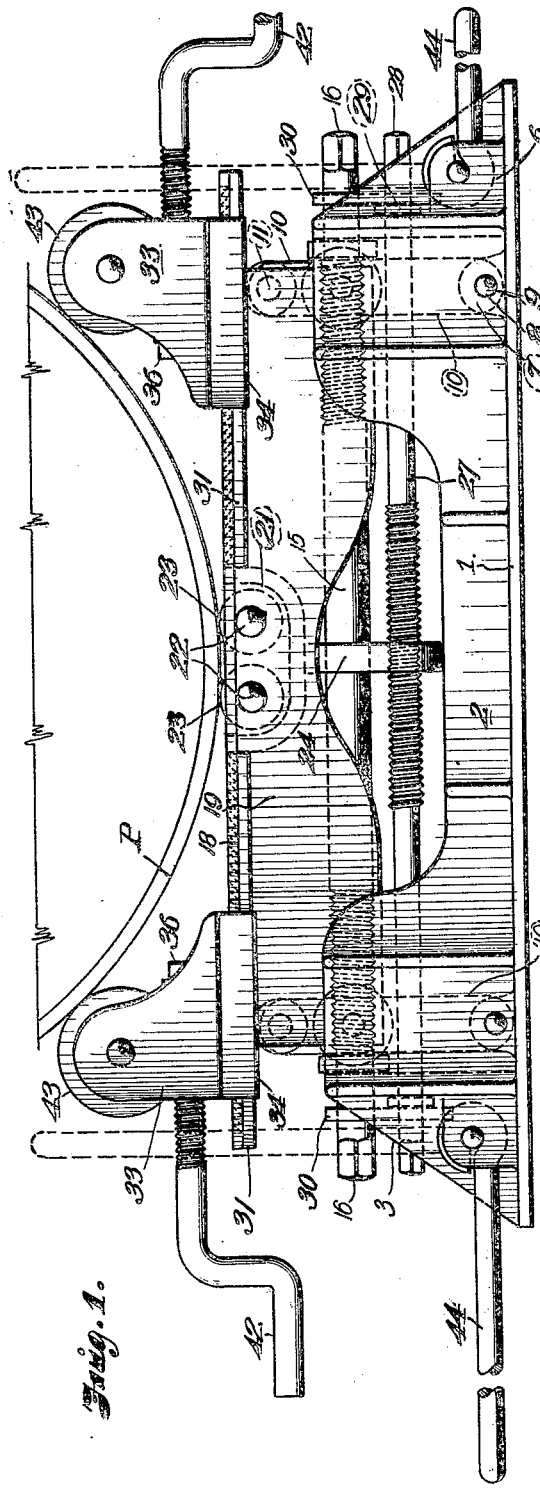
INVENTOR.
J. J. Tipton.
BY Thorpe & Thorpe
ATTORNEYS.

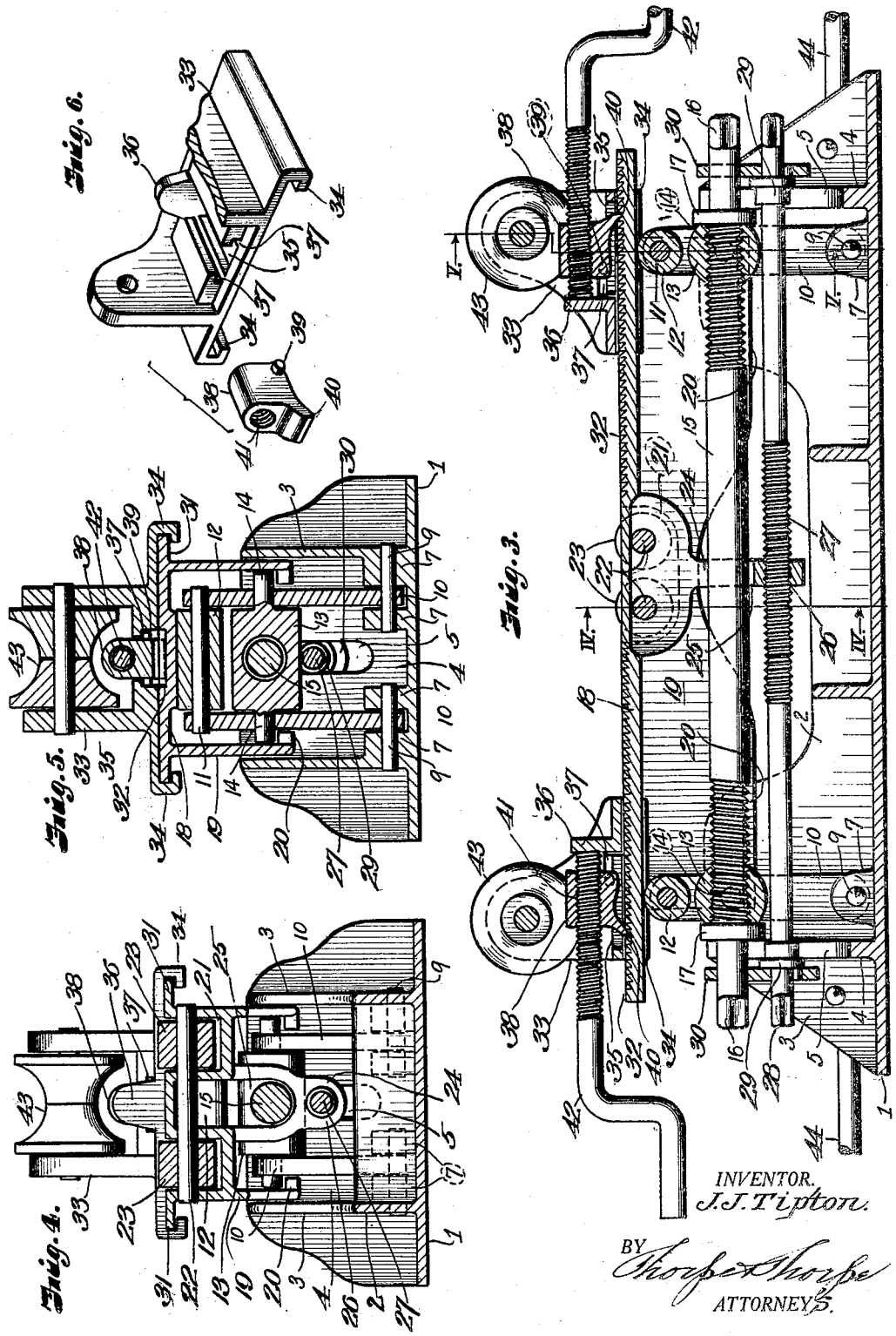

Patented Aug. 9, 1932

1,870,760

UNITED STATES PATENT OFFICE

JOHN J. TIPTON, OF KANSAS CITY, MISSOURI

PIPE LINE DOLLY

Application filed June 24, 1931. Serial No. 546,498.

This invention relates to dollies for leveling, supporting and adjusting pipe sections, and more especially is designed for use preparatory to the welding of the sections together to constitute a pipe-line conduit for gas, oil or other fluids. In field operations, the pipe sections are lined up for a long distance ahead of the welders as the lining up of each section consumes more time than the welding of a section in place, and the comparative slowness of the lining-up gang frequently causes financial loss because the welders are delayed in their work. Heretofore, it has been customary to deposit the pipe sections on skids and it has frequently happened that a section would roll out of alinement, especially as the skids, resting on uneven ground under the ordinary conditions, are seldom perfectly horizontal.

In practice there will be a dolly underlying and supporting the adjacent ends of each pair of pipe sections, in other words, a dolly at each joint to be welded. To obviate loss of time incident to lining up the pipe sections on skids, it is very desirable and it is my object to produce a dolly by which, in pairs, a pipe section can be lined up quickly and accurately and be retained securely in its lined-up position until welded to the line of pipe behind it.

More specifically my object is to produce a dolly by which the superimposed end of a pipe section can be raised, lowered or shifted laterally; which affords means to guard against chance of the section rolling accidentally out of line, and which affords a roller support to facilitate the revolving of the pipe section with the line already welded, without affecting the section ahead to be next welded into the line. A further object is to produce a dolly which can be lifted by one man, and which is operable by two men for the lifting of an end of the largest size pipe used in field pipe lines.

With the general objects named in view and others as will hereinafter appear, the invention consists in certain novel and useful features of construction and combinations of parts as hereinafter described and claimed; and in order that it may be fully understood, reference is to be had to the accompanying drawings, in which:—

Figure 1 is a side elevation of a dolly embodying the invention.

Figure 2 is a top plan view of the dolly.

Figure 3 is a central vertical section of the dolly.

Figure 4 is a cross section on the line IV—IV of Figure 3.

Figure 5 is a cross section on the line V—V of Figure 3.

Figure 6 is a fragmentary perspective view of one of a pair of adjustable brackets and dogs for preventing a pipe engaged by the pair of brackets, from rolling out of alinement with previously welded pipe sections.

Referring now to the detail construction, 1 indicates a base having braced side walls 2 which, at opposite ends are increased in height at 3, and opposite end portions 3 are connected by vertical end walls 4 provided with central slots or bifurcations 5. Projecting upwardly from the base at the outer sides of wall ends 3 are pairs of perforated lugs 6 and at the inner sides of the walls perforated pairs of lugs 7 are provided, the pairs of lugs 7 being disposed between and near the respective end walls, the perforations of opposite lugs being alined and those of the outermost extending through the side walls as at 8. Pivot pins 9 are secured in the lugs, and mounted on the pivot pins of and between each pair of lugs 7 is a link 10, opposite links being connected near their upper ends by cross pins 11 on which are journaled rollers 12, the links and rollers constituting frames for swinging inwardly from or outwardly to vertical positions for the purpose of lowering or raising a table and other parts hereinafter described.

For effecting the actions of the swing frames, each carries a nut 13, located between the respective links and provided with opposite trunnions 14 journaled in said links. A longitudinally arranged rod 15 extends through the slots or bifurcations 5 of the end walls and is provided near its ends with reversely threaded portions respectively engaging the nuts 13, the rod having squared ends 16 for convenient engagement by a crank or the like, not shown, and collars 17 on the rod, are interposed between the nuts and the end walls to prevent longitudinal movement of the rod when turned to cause the nuts to travel and effect operation of the swing frames.

A table 18 bridges the space between the rollers 12 and rests thereon. It is provided at its side margins with longitudinal walls or ribs 19 depending between the swing frames and the side wall end portions 3 of the base, and at the lower edges of said walls or ribs 19 are inwardly-projecting flanges 20 underlying the extremities of the trunnions 14, this arrangement being to guard against upward movement and possible dislocation of the table in the event of careless handling in placing the dolly upon or removing it from a truck or in moving it from place to place. It is merely provided as an insurance against accidental injury to a person handling the dolly.

The table has centrally-disposed pockets 21 through which pins 22 extend transversely and form journals for two sets of anti-friction rollers 23 of diameter to project to a plane above that of the table, the rollers at opposite sides of the longitudinal center line of the table, respectively underlying and forming supports for the adjacent ends of two pipe sections P (one only appears), to be welded end to end. If the ends of such pipe sections are not truly alined and it is necessary to shift one laterally to secure alinement, provision is at hand to accomplish such result by imparting longitudinal movement to the table. For this purpose the table has a central transverse depending lug 24 provided with a vertical slot 25 accommodating the rod 15 and a threaded opening 26 engaging a longitudinal screw rod 27, which rod projects at its ends through the slots or bifurcations 5, and has squared ends 28 for engagement by a suitable crank or turning tool not shown. The screw rod is equipped with a pair of flanged collars 29 to fit snugly in the slot or bifurcations 5, and against the end walls 4 to inhibit endwise movement of the rod when it is turned to impart endwise adjustment of the table and sidewise adjustment of the pipe section or sections resting upon the rollers 23. To stabilize the ends of the rod 27 against sagging relative to rod 15, vertical links 30 are employed.

The side edges of the table are equipped with outwardly-projecting flanges 31 and its central portion with a longitudinal series of ratchet teeth 32 facing upwardly but in opposite directions. A bracket 33 rests upon each end of the table and to hold the brackets in position without interfering with the adjustment longitudinally of the table, they are provided at opposite edges with depending hooks 34 engaging the outer edges and undersides of flanges 31. The brackets have openings 35 and upstanding abutments 36, at the inner ends of said openings, and the side walls of the openings are undercut to provide grooves 37. Dogs 38 depend into said openings and have trunnions 39 at their inner ends engaging the grooves 37, and depending teeth 40 for engagement with the respective rack portions of the table. The dogs also have threaded bores 41 engaged by threaded end of cranks 42, the front or inner ends of the cranks engaging the respective abutments 36 so that when turned in the proper direction the thrust of the dogs against the racks will cause the respective brackets to approach. To effect receding movement, the cranks are turned backward to cause the dogs to move inwardly slightly to relax their pressure on the racks. The cranks can then be secured upward to cause the dogs to rock on their trunnions until the teeth are above the rack. The brackets are then free to be slid outward.

The brackets carry sectional or divided peripherally grooved rollers 43, for engagement with a pipe section or abutting sections at opposite sides as shown by Figure 1, the special function of said rollers being to guard against the rolling of a pipe section off the dolly, or such lateral movement as would throw the section out of line with the section to which it is to be welded, it being noted that because the said rollers are peripherally grooved, they offer no interference with the welding operation performed as the section is revolved readily about its own axis on the supporting and guide rollers 22 and 43 respectively. It will be understood, of course, that the joint between the abutting ends of two pipe sections occurs in the vertical plane of the peripheral grooves of the divided rollers 43, and that the peripheral grooves give the welder free access with his welding apparatus.

For convenience in lifting the dolly, it is provided at each end with a bail 44, which are mounted at their ends in lugs 6, and are large enough when occupying a vertical or operative position, to extend well above the brackets 33 so that the hands of the operator are not liable to be injured by contact with rollers 43.

As the functions of the several parts of the dolly have been explained in connection with the description thereof, no recapitulation of the operation is thought necessary or desirable, it being understood that the dolly can be modified in various particulars within the principle of construction and mode of operation involved, without departure from the spirit and scope of the appended claims.

I claim:—

1. A pipe line dolly, comprising a base, a table above the base, means on the base supporting the table and adjustable to vary the height of the latter, means on the table to engage opposite sides of and retain a pipe section on the table against rolling or shifting laterally, and means for effecting longitudinal adjustment of the table to shift the pipe section laterally.

2. A pipe line dolly, comprising a base, a table above the base, means on the base supporting the table and adjustable to vary the height of the latter, antifriction rollers on the table as an underlying direct support for pipe sections, means on the table to engage opposite sides of and retain a pipe section on the table against rolling or shifting laterally, and means for effecting longitudinal adjustment of the table to shift the pipe section laterally.

3. A pipe line dolly, comprising a base, a table above the base, means on the base supporting the table and adjustable to vary the height of the latter, a rod having a threaded relation with said means to effect the adjustment thereof, means to hold the rod against longitudinal movement, means on the table to engage opposite sides of and retain a pipe section on the table against rolling or shifting laterally, and means for effecting longitudinal adjustment of the table to shift the pipe section laterally.

4. A pipe line dolly comprising a base, a pair of swing frames on the base, nuts pivotally mounted on the swing frames, a rod having reverse threads respectively engaging said nuts, a table upon the swing frame for the support of a pipe section, and means to adjust the table cross-wise of the pipe section to shift the latter laterally.

5. A pipe line dolly comprising a base, a pair of swing frames on the base, nuts pivotally mounted on the swing frames, a rod having reverse threads respectively engaging said nuts, a table upon the swing frame for the support of a pipe section, a rotatable rod having a threaded engagement with the table to effect endwise movement thereof, and means to prevent endwise movement of the rods.

6. A pipe line dolly, comprising a base, a pair of swing frames thereon, means for effecting simultaneous approaching or receding movement of the said frames, a table resting on the swing frames and provided with flanges underlying parts of the swing frames, means to effect endwise movement of the table, and rollers carried by the table to respectively support a pipe section and hold it against accidental rolling movement on the table.

7. A pipe line dolly, comprising a base, a pair of swing frames thereon, means for effecting simultaneous approaching or receding movement of the said frames, a table resting on the swing frames and provided with flanges underlying parts of the swing frames, means to effect endwise movement of the table, rollers carried by the table to respectively support a pipe section and hold it against accidental rolling movement on the table, and means for effecting adjustment of the holding rollers, longitudinally of the table.

8. A pipe line dolly, comprising a base, a table above the base, means on the base for underlying and effecting vertical movement of the table, the latter having a pair of longitudinal upwardly-facing racks, a pair of brackets on the table and having side hooks engaging the side edges of the table, peripherally grooved rollers carried by the brackets, and means for cooperating with the respective racks for effecting relative approaching or receding sliding movement of the brackets on the table.

In testimony whereof I affix my signature.

JOHN J. TIPTON.